(12) United States Patent
Zhang et al.

(10) Patent No.: US 12,710,120 B2
(45) Date of Patent: Aug. 18, 2026

(54) MINING HOSE CONNECTING DEVICE AND METHOD

(71) Applicant: CCTEG CHONGQING RESEARCH INSTITUTE CO., LTD., Chongqing (CN)

(72) Inventors: Yongjiang Zhang, Chongqing (CN); Lindong Guo, Chongqing (CN); Xusheng Zhao, Chongqing (CN); Zhanjin Lu, Chongqing (CN); Zhenfei Huang, Chongqing (CN); Xianzheng Meng, Chongqing (CN); Chengcheng Li, Chongqing (CN); Huiming Yang, Chongqing (CN); Jianjun Cao, Chongqing (CN); Shuai Li, Chongqing (CN); Fei Ji, Chongqing (CN); Jun Liu, Chongqing (CN); Xingang Niu, Chongqing (CN); Zhonghua Wang, Chongqing (CN); Yongsan Liu, Chongqing (CN); Huaifu Liu, Chongqing (CN); Shanchao Hu, Chongqing (CN)

(73) Assignee: CCTEG CHONGQING RESEARCH INSTITUTE CO., LTD., Chongqing (CN)

( * ) Notice: Subject to any disclaimer, the term of this patent is extended or adjusted under 35 U.S.C. 154(b) by 0 days.

(21) Appl. No.: 18/555,530

(22) PCT Filed: May 24, 2022

(86) PCT No.: PCT/CN2022/094622

§ 371 (c)(1),
(2) Date: Jan. 28, 2025

(87) PCT Pub. No.: WO2023/201832

PCT Pub. Date: Oct. 26, 2023

(65) Prior Publication Data

US 2025/0075832 A1 Mar. 6, 2025

(30) Foreign Application Priority Data

Apr. 18, 2022 (CN) ........................ 202210404492.5

(51) Int. Cl.
*F16L 33/22* (2006.01)
*F16L 21/06* (2006.01)

(52) U.S. Cl.
CPC .......... *F16L 33/224* (2013.01); *F16L 33/223* (2013.01); *F16L 21/06* (2013.01)

(58) Field of Classification Search
CPC . F16L 17/04; F16L 21/06; F16L 21/08; F16L 33/32; F16L 33/223; F16L 33/224; F16L 31/00
See application file for complete search history.

(56) References Cited

U.S. PATENT DOCUMENTS 1,181,676 A * 5/1916 Lambkin
2,501,619 A * 3/1950 Schulthess
(Continued)

FOREIGN PATENT DOCUMENTS

CN 1209518 A 3/1999
CN 2447610 Y 9/2001
(Continued)

OTHER PUBLICATIONS

KR-20200002010-U—Machine Translation—English (Year: 2020).*
(Continued)

*Primary Examiner* — William S. Choi
(74) *Attorney, Agent, or Firm* — Westbridge IP LLC

(57) ABSTRACT

The present invention relates to a mining hose connecting device and method, and belongs to the field of underground hydraulic equipment for coal mines. The mining hose connecting device comprises a joint unit, wherein the joint unit comprises a first joint and a second joint; a first fastening unit, wherein the first fastening unit is arranged symmetri-
(Continued)

cally about a first plane, and the inner diameter of the first fastening unit is respectively in clearance fit with the outer diameters of the first joint and the second joint; and a second fastening unit, comprising a first fastener and a second fastener, wherein the inner diameters of the first fastener and the second fastener are respectively in clearance fit with the outer diameter of the first fastening unit. A first hose and a second hose are connected respectively through the first joint and the second joint, the end face seal of the joint unit is realized through the first fastening unit, the secondary seal of the first fastening unit is carried out through the second fastening unit to form a firm connecting structure, and the drag resistance of the first hose and the second hose after connection is enhanced to avoid blowout of flow media.

7 Claims, 2 Drawing Sheets

(56) References Cited

U.S. PATENT DOCUMENTS

| | | | | |
|---|---|---|---|---|
| 2,544,712 | A * | 3/1951 | Miller | |
| 2,551,536 | A * | 5/1951 | Harvey | F16L 33/223 |
| 3,630,552 | A * | 12/1971 | Byron | F16L 31/00 |
| 4,236,736 | A * | 12/1980 | Anderson | F16L 33/224 |
| 5,332,269 | A * | 7/1994 | Homm | |
| 5,695,226 | A | 12/1997 | Gouda | |
| 9,194,517 | B2 * | 11/2015 | Peirce | F16L 33/223 |
| 2013/0015626 | A1 | 1/2013 | Kim et al. | |

FOREIGN PATENT DOCUMENTS

| | | | | |
|---|---|---|---|---|
| CN | 203394560 | U | | 1/2014 |
| CN | 203797209 | U | | 8/2014 |
| CN | 106641504 | A | | 5/2017 |
| CN | 107289129 | A | | 10/2017 |
| CN | 208503730 | U | | 2/2019 |
| GB | 1466137 | A | | 3/1977 |
| GB | 2103744 | A | * | 2/1983 |
| KR | 20200002010 | U | * | 9/2020 |

OTHER PUBLICATIONS

Office Action of Corresponding CN application 202210404492.5, published on Oct. 25, 2022.

Notice of Grant of Patent Right of corresponding CN application 202210404492.5, published on Dec. 7, 2022.

The grant claims of corresponding CN application 202210404492.5.

* cited by examiner

Figure 3:
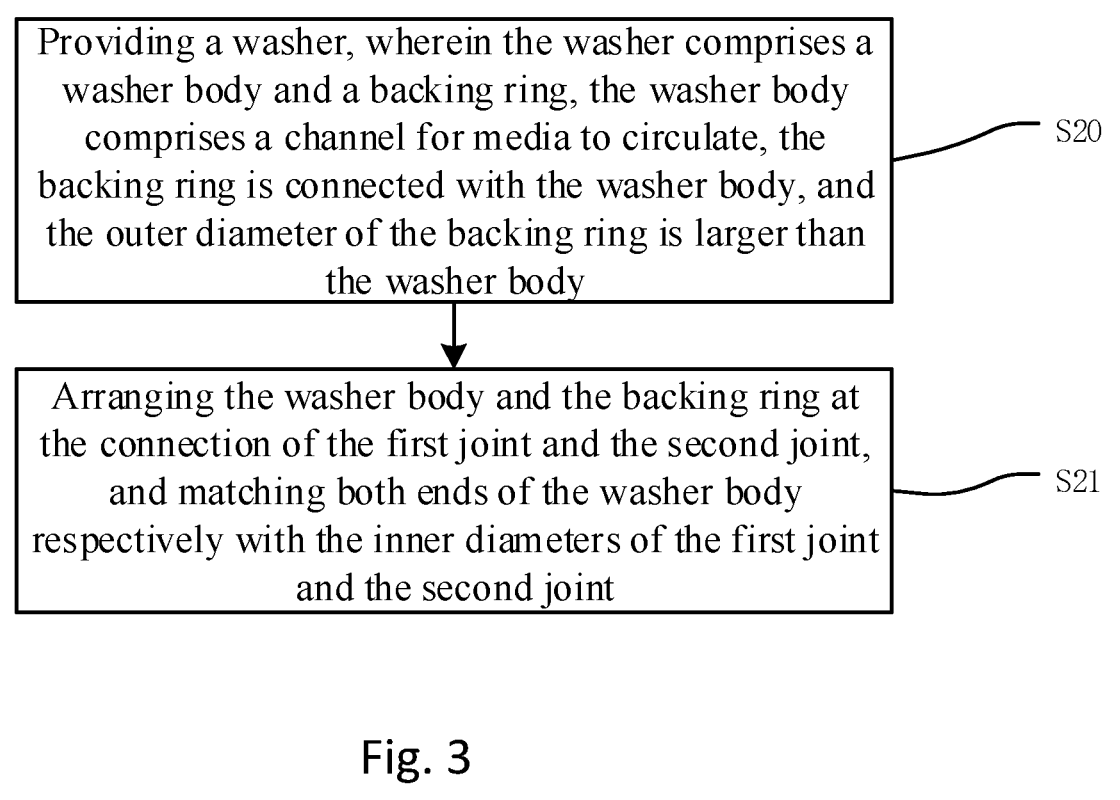

Providing a washer, wherein the washer comprises a washer body and a backing ring, the washer body comprises a channel for media to circulate, the backing ring is connected with the washer body, and the outer diameter of the backing ring is larger than the washer body

S20

Arranging the washer body and the backing ring at the connection of the first joint and the second joint, and matching both ends of the washer body respectively with the inner diameters of the first joint and the second joint

MINING HOSE CONNECTING DEVICE AND METHOD

FIELD OF INVENTION

The present invention belongs to the field of underground hydraulic equipment for coal mines, and relates to a mining hose connecting device and method.

BACKGROUND ART OF THE INVENTION

Coal is an important fuel resource and plays a leading role in the supply of industrialized basic energy. Safe mining of coal is an important work of safe production in major coal mine enterprises, gas outburst accounts for a large proportion in high gassy mines, and gas dynamical disasters severely restricts safe production. In recent years, hydraulic measures have become the main means in the field of gas disaster control of coal mines. The risk of gas disaster can be reduced by fracturing or slitting inner coal seams with high-pressure water through drilling in the coal seams for pressure relief permeability improvement. At the stage of hydraulic construction, ensuring the safe transmission of high-pressure water is the primary work of site safety. Therefore, high-pressure mining hose connection must ensure firm connection and strong tightness of high-pressure hose joints, and prevent injury accidents caused by high-pressure water.

At present, high-pressure hoses are generally connected by thread interfaces or U-shaped clamp connectors at the stage of hydraulic construction. For connection by thread interfaces, when water pipes are connected in use on the site, it is necessary to tighten nuts, and the frequent disassembly of thread interfaces easily causes thread wear and thus results in unstable joint connection and untight seal. U-shaped clamp connectors are convenient to operate, but cannot ensure tight butt of water pipe connectors, which results in poor tightness and thus leads to phenomena of water leak and water penetration, so certain potential safety hazard exists.

DISCLOSURE OF THE INVENTION

In view of this, the purpose of the present invention is to provide a mining hose connecting device and method to solve the problem of poor connection performance of mining hoses in the prior art.

To achieve the above purpose, the present invention provides the following technical solution:

A mining hose connecting device, used for connecting a first hose and a second hose, comprises:

A joint unit, wherein the joint unit comprises a first joint and a second joint, the inner diameter of the first joint is matched with the outer diameter of the first hose, and the inner diameter of the second joint is matched with the outer diameter of the second hose;

A first fastening unit, wherein the first fastening unit is arranged symmetrically about a first plane, the inner diameter of the first fastening unit is respectively in clearance fit with the outer diameters of the first joint and the second joint, and the first plane is parallel to the extension direction of the first fastening unit;

A second fastening unit, comprising a first fastener and a second fastener, wherein the inner diameters of the first fastener and the second fastener are respectively in clearance fit with the outer diameter of the first fastening unit.

Optionally, the mining hose connecting device also comprises a washer arranged at the connection of the first joint and the second joint, wherein the washer comprises a washer body and a backing ring, the washer body comprises a channel for media to circulate, both ends of the washer body are respectively matched with the inner diameters of the first joint and the second joint, the backing ring is connected with the washer body, the outer diameter of the backing ring is larger than the washer body, and the backing ring is arranged at the connection of the first joint and the second joint.

Optionally, the washer also comprises a backing ring, and the backing ring is also provided with a seal ring.

Optionally, the inner diameter of the channel is less than or equal to the inner diameters of the first hose and the second hose.

Optionally, the first joint and the second joint are respectively provided with clamping columns and/or clamping grooves, and the first fastening unit is connected with the joint unit through the clamping columns and/or the clamping grooves.

Optionally, the inner diameter of the first joint is bonded with the first hose, and the inner diameter of the second joint is bonded with the second hose.

Optionally, the inner diameters of the first fastener and the second fastener are respectively in thread fit with the outer diameter of the first fastening unit.

Optionally, one end of the first joint away from the second joint and one end of the second joint away from the first joint are respectively provided with a joint fastening ring, and the joint fastening rings are in clearance fit with the first fastening unit.

A mining hose connecting method, used for connecting a first hose and a second hose by using the mining hose connecting device, comprises:

Running the first hose through the first fastener, and running the second hose through the second faster;

Matching the outer diameter of the first hose with the inner diameter of the first joint, and matching the outer diameter of the second hose with the inner diameter of the second joint;

Making the inner diameter of the first fastening unit respectively in clearance fit with the outer diameters of the first joint and the second joint;

Making the inner diameters of the first fastener and the second fastener respectively in clearance fit with the outer diameter of the first fastening unit.

Optionally, the mining hose connecting method comprises the following steps after the step of matching the outer diameter of the first hose with the inner diameter of the first joint and matching the outer diameter of the second hose with the inner diameter of the second joint:

Providing a washer, wherein the washer comprises a washer body and a backing ring, the washer body comprises a channel for media to circulate, the backing ring is connected with the washer body, and the outer diameter of the backing ring is larger than the washer body;

Arranging the washer body and the backing ring at the connection of the first joint and the second joint, and matching both ends of the washer body respectively with the inner diameters of the first joint and the second joint.

The present invention has the following beneficial effects: the first hose and the second hose are connected respectively through the first joint and the second joint, the end face seal of the joint unit is realized through the first fastening unit, the secondary seal of the first fastening unit is carried out through the second fastening unit to form a firm connecting structure, and the drag resistance of the first hose and the second hose after connection is enhanced to avoid blowout of flow media.

Other advantages, objectives and features of the present invention will be illustrated in the following description to some extent, and will be apparent to those skilled in the art based on the following investigation and research to some extent, or can be taught from the practice of the present invention. The objectives and other advantages of the present invention can be realized and obtained through the following description.

DESCRIPTION OF THE DRAWINGS

To enable the purpose, the technical solution and the advantages of the present invention to be more clear, the present invention will be preferably described in detail below in combination with the drawings, wherein:

FIG. 3 is a flow diagram of a mining hose connecting method in another embodiment.

Figure 1:
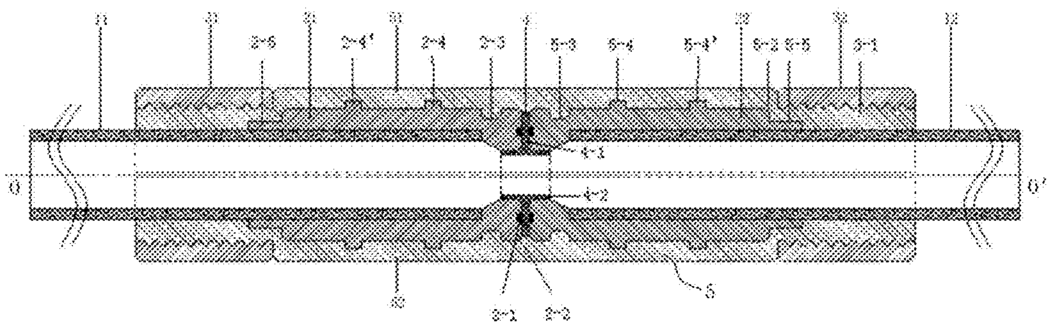
FIG. 1 is a structural schematic diagram of a mining hose connecting device in an embodiment.

Reference signs: first fastening unit 5, first hose 11, second hose 12, first joint 21, second joint 22, first fastener 31, second fastener 32, washer 4, first split body 51, second split body 52, seal ring 2-1, chamfering bevel 2-2, first clamping groove 2-3, first clamping column 2-4, fastening ring 2-5, backing ring 4-1, washer body 4-2, chamfering bevel groove 5-2, second clamping column 5-3, second clamping groove 5-4 and third clamping groove 5-5, first plane 0-0'.

DETAILED DESCRIPTION OF THE INVENTION

Embodiments of the present invention are described below through specific embodiments. Those skilled in the art can understand other advantages and effects of the present invention easily through the disclosure of the description. The present invention can also be implemented or applied through additional different specific embodiments. All details in the description can be modified or changed based on different perspectives and applications without departing from the spirit of the present invention. It should be noted that the figures provided in the following embodiments only exemplarily explain the basic conception of the present invention, and if there is no conflict, the following embodiments and the features in the embodiments can be mutually combined.

Wherein the drawings are only used for exemplary description, are only schematic diagrams rather than physical diagrams, and shall not be understood as a limitation to the present invention. In order to better illustrate the embodiments of the present invention, some components in the drawings may be omitted, scaled up or scaled down, and do not reflect actual product sizes. It should be understandable for those skilled in the art that some well-known structures and description thereof in the drawings may be omitted.

Same or similar reference signs in the drawings of the embodiments of the present invention refer to same or similar components. It should be understood in the description of the present invention that terms such as "upper", "lower", "left", "right", "front" and "back" indicate direction or position relationships shown based on the drawings, and are only intended to facilitate the description of the present invention and the simplification of the description rather than to indicate or imply that the indicated device or element must have a specific direction or constructed and operated in a specific direction, and therefore, the terms describing position relationships in the drawings are only used for exemplary description and shall not be understood as a limitation to the present invention; for those ordinary skilled in the art, the meanings of the above terms may be understood according to specific conditions.

Referring to FIG. 1, the embodiment provides a mining hose connecting device, used for connecting a first hose 11 and a second hose 12, comprising:

A joint unit, wherein the joint unit comprises a first joint 21 and a second joint 22, the inner diameter of the first joint 21 is matched with the outer diameter of the first hose 11, and the inner diameter of the second joint 22 is matched with the outer diameter of the second hose 12;

A first fastening unit 5, wherein the first fastening unit 5 is arranged symmetrically about a first plane 0-0', the inner diameter of the first fastening unit 5 is respectively in clearance fit with the outer diameters of the first joint 21 and the second joint 22, and the first plane 0-0' is parallel to the extension direction of the first fastening unit 5;

A second fastening unit, comprising a first fastener 31 and a second fastener 32, wherein the inner diameters of the first fastener 31 and the second fastener 32 are respectively in clearance fit with the outer diameter of the first fastening unit 5.

The first hose 11 and the second hose 12 are connected respectively through the first joint 21 and the second joint 22, the end face seal of the joint unit is realized through the first fastening unit 5, the secondary seal of the first fastening unit 5 is carried out through the second fastening unit to form a firm connecting structure, and the drag resistance of the first hose 11 and the second hose 12 after connection is enhanced to avoid blowout of flow media.

Exemplarily, adhesive can be applied to outer wall joints of the first hose 11 and the second hose 12, and fixation of the first hose 11 and the first joint 21 and fixation of the second hose 12 and the second joint 22 are realized through the adhesive. For example, the length of the first joint 21 and the second joint 22 in the extension direction is less than or equal to 10 cm, and first clamping grooves 2-3 and first clamping columns 2-4 arranged on the joint unit and the first fastening unit 5 are arranged at equal intervals. A seal ring 2-1 can be an O-ring, which is arranged in the middle position of the end face of the first joint 21 or the second joint 22 and also has equal distances to the outer wall and the inner wall of the first joint 21 or the second joint 22, and a fastening ring 2-5 has the length of 2-5 cm, for example, 2 cm, 3 cm or 5 cm, and has the functions of fixing and preventing breakage of the first hose 11 and the second hose 12.

In some embodiments, chamfering bevels 2-2 with inclinations of 30-45°, for example, 45°, are distributed on the outer sides of both ends of the first joint 21 and the second joint 22 and on the joint clamping grooves 2-3 and the joint clamping columns 2-4, and can realize rapid installation and avoid causing wear.

In some embodiments, the first fastening unit 5 is arranged symmetrically about a first plane 0-0', 0', the inner diameter of the first fastening unit 5 is respectively in clearance fit with the outer diameters of the first joint 21 and the second joint 22, and the first plane 0-0' is parallel to the extension direction of the first fastening unit 5, for example, the first fastening unit 5 comprises two symmetrical split bodies.

In some embodiments, the mining hose connecting device also comprises a washer 4 arranged at the connection of the first joint 21 and the second joint 22, wherein the washer 4 comprises a washer body 4-2 and a backing ring 4-1, the washer body 4-2 comprises a channel for media to circulate, both ends of the washer body 4-2 are respectively matched with the inner diameters of the first joint 21 and the second joint 22, the backing ring 4-1 is connected with the washer body 4-2, the outer diameter of the backing ring 4-1 is larger than the washer body 4-2, and the backing ring 4-1 is arranged at the connection of the first joint 21 and the second joint.

The washer body 4-2 is installed in an interface at the joint of the first hose 21, and the second hose 22 is butted with the washer body 4-2. The washer 4 also comprises a backing ring 4-1, for example, the backing ring 4-1 can be a rigid polyurethane backing ring, and the washer 4 has an integral structure. The outer diameter of the backing ring 4-1 is flush with the outer end faces of the first joint 21 and the second joint 22, and the thickness is 5 to 10 mm, for example, 5 mm. The outer diameter of the washer body 4-2 is consistent with the inner diameters of the first joint 21 and the second joint 22 to facilitate sealing, and the length is 10 to 30 mm, for example, 20 mm.

Optionally, the washer 4 also comprises a backing ring 4-1, and the backing ring 4-1 is also provided with a seal ring 2-1.

Optionally, the inner diameter of the channel is less than or equal to the inner diameters of the first hose 11 and the second hose 12.

Optionally, the first joint 21 and the second joint 22 are respectively provided with clamping columns and/or clamping grooves, and the first fastening unit 5 is connected with the joint unit through the clamping columns and/or the clamping grooves.

Optionally, the inner diameter of the first joint 21 is bonded with the first hose 11, and the inner diameter of the second joint 22 is bonded with the second hose 12.

Optionally, the inner diameters of the first fastener 31 and the second fastener 32 are respectively in thread fit with the outer diameter of the first fastening unit 5.

Optionally, one end of the first joint 21 away from the second joint 22 and one end of the second joint 22 away from the first joint 21 are respectively provided with a joint fastening ring 2-5, and the joint fastening rings 2-5 are in clearance fit with the first fastening unit 5.

Figure 2:
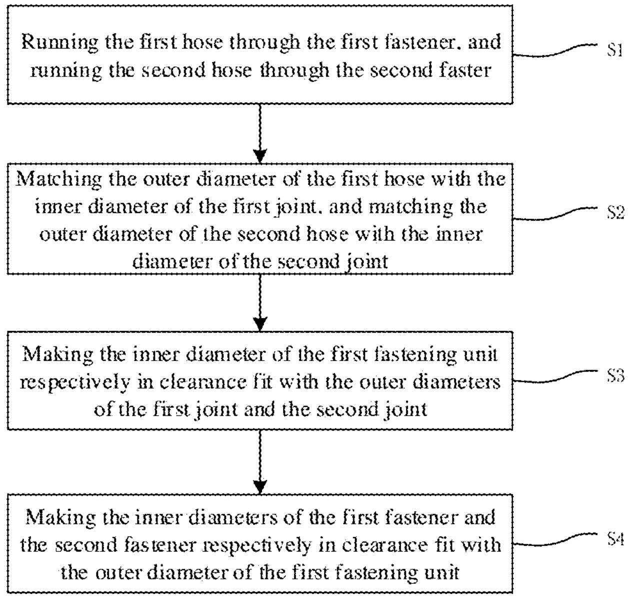
FIG. 2 is a flow diagram of a mining hose connecting method in an embodiment.

Referring to FIG. 2, the embodiment also provides a mining hose connecting method, used for connecting the first hose 11 and the second hose 12 by using the mining hose connecting device, comprising:

S1: running the first hose 11 through the first fastener 31, and running the second hose 12 through the second faster 32;

S2: matching the outer diameter of the first hose 11 with the inner diameter of the first joint 21, and matching the outer diameter of the second hose 12 with the inner diameter of the second joint 22;

S3: making the inner diameter of the first fastening unit 5 respectively in clearance fit with the outer diameters of the first joint 21 and the second joint 22;

S4: making the inner diameters of the first fastener 31 and the second fastener 32 respectively in clearance fit with the outer diameter of the first fastening unit 5.

In other embodiments, the mining hose connecting method comprises a step S20 after the step S2 of matching the outer diameter of the first hose 11 with the inner diameter of the first joint 21 and matching the outer diameter of the second hose 12 with the inner diameter of the second joint 22:

Providing a washer 4, wherein the washer 4 comprises a washer body 4-2 and a backing ring 4-1, the washer body 4-2 comprises a channel for media to circulate, the backing ring 4-1 is connected with the washer body 4-2, and the outer diameter of the backing ring 4-1 is larger than the washer body 4-2;

Step S21: arranging the washer body 4-2 and the backing ring 4-1 at the connection of the first joint 21 and the second joint 22, and matching both ends of the washer body 4-2 respectively with the inner diameters of the first joint 21 and the second joint 22.

In the implementation process, the first joint 21 and the second joint 22 are placed on the split bodies corresponding to the first fastening unit 5 according to the corresponding positions after being butted, and the two split bodies are matched and then tightened respectively with the first fastener 31 and the second fastener 32 to complete connection.

The split bodies corresponding to the first fastening unit 5 mainly comprise thread interfaces, chamfering bevel grooves 5-2, second clamping columns 5-3, second clamping grooves 5-4 and third clamping grooves 5-5. The thread interfaces are arranged on both ends of the split bodies corresponding to the first fastening unit 5 and adapted with the first fastener 31/the second fastener 32, and the second clamping columns 5-3, the second clamping grooves 5-4 and the third clamping grooves 5-5 are arranged corresponding to the clamping grooves, the clamping columns and the fastening rings 2-5 on the joint unit, which plays a role of fixation to ensure reliable connection of mining hoses; and the chamfering bevel grooves 5-2 are adapted with chamfering levels distributed on the outer sides of both ends of the first joint 11/the second joint 12 and on the first clamping grooves 2-3 and the first clamping columns 2-4 to form an end face seal structure.

Finally, it should be noted that the above embodiments are only used for describing, rather than limiting the technical solution of the present invention. Although the present invention is described in detail with reference to the preferred embodiments, those ordinary skilled in the art shall understand that the technical solution of the present invention can be amended or equivalently replaced without departing from the purpose and the scope of the technical solution. The amendment or equivalent replacement shall be covered within the scope of the claims of the present invention.

The invention claimed is:

1. A mining hose connecting device for connecting a first hose and a second hose, comprising:

a joint unit, wherein the joint unit comprises a first joint and a second joint, an inner diameter of the first joint is matched with an outer diameter of the first hose, and the inner diameter of the second joint is matched with the outer diameter of the second hose; wherein the inner diameter of the first joint is bonded with the first hose, and the inner diameter of the second joint is bonded with the second hose;

a first fastening unit, wherein the first fastening unit is arranged symmetrically about a first plane, the inner diameter of the first fastening unit is respectively in clearance fit with outer diameters of the first joint and the second joint, and the first plane is parallel to an extension direction of the first fastening unit;

a second fastening unit, comprising a first fastener and a second fastener, wherein inner diameters of the first fastener and the second fastener are respectively in clearance fit with the outer diameter of the first fastening unit; and a washer arranged at a connection of the first joint and the second joint, wherein the washer comprises a washer body and a backing ring, the washer body comprises a channel for media to circulate, both ends of the washer body are respectively matched with second inner diameters of the first joint and the second joint, the backing ring is connected with the washer body, the outer diameter of the backing ring is larger than the washer body, the backing ring is arranged at the connection of the first joint and the second joint; and the backing ring is also provided with a seal ring.

2. The mining hose connecting device as claimed in claim 1, wherein the inner diameter of the channel is less than or equal to inner diameters of the first hose and the second hose.

3. The mining hose connecting device as claimed in claim 1, wherein the first joint and the second joint are respectively provided with clamping columns and/or clamping grooves, and the first fastening unit is connected with the joint unit through the clamping columns and/or the clamping grooves.

4. The mining hose connecting device as claimed in claim 1, wherein the inner diameters of the first fastener and the second fastener are respectively in thread fit with the outer diameter of the first fastening unit.

5. The mining hose connecting device as claimed in claim 1, wherein one end of the first joint away from the second joint and one end of the second joint away from the first joint are respectively provided with a joint fastening ring, and the joint fastening rings are in clearance fit with the first fastening unit.

6. A method for connecting the first hose and the second hose by the mining hose connecting device of claim 1, the method comprising:

running the first hose through the first fastener, and running the second hose through the second fastener;

matching the outer diameter of the first hose with the inner diameter of the first joint, and matching the outer diameter of the second hose with the inner diameter of the second joint;

making the inner diameter of the first fastening unit respectively in clearance fit with outer diameters of the first joint and the second joint; and making inner diameters of the first fastener and the second fastener respectively in clearance fit with the outer diameter of the first fastening unit.

7. The method of claim 6, wherein matching the outer diameter of the first hose with the inner diameter of the first joint, and matching the outer diameter of the second hose with the inner diameter of the second joint further comprises:

providing a washer, wherein the washer comprises a washer body and a backing ring, the washer body comprises a channel for media to circulate, the backing ring is connected with the washer body, and the outer diameter of the backing ring is larger than the washer body; and arranging the washer body and the backing ring at a connection of the first joint and the second joint, and matching both ends of the washer body respectively with second inner diameters of the first joint and the second joint.

* * * * *